(12) United States Patent
Starkowsky et al.

(10) Patent No.: US 7,596,516 B2
(45) Date of Patent: Sep. 29, 2009

(54) REVERSE LOGISTICS PROCESS

(75) Inventors: Joan M. Starkowsky, Silver Lake, OH (US); Richard M. Spicer, Cuyahoga Falls, OH (US); Randy Riddell, Hudson, OH (US)

(73) Assignee: YRC Worldwide, Inc., Overland Park, KS (US)

( * ) Notice: Subject to any disclaimer, the term of this patent is extended or adjusted under 35 U.S.C. 154(b) by 576 days.

(21) Appl. No.: 10/878,808

(22) Filed: Jun. 28, 2004

(65) Prior Publication Data
US 2005/0015315 A1    Jan. 20, 2005

Related U.S. Application Data

(60) Provisional application No. 60/484,621, filed on Jul. 2, 2003.

(51) Int. Cl.
*G06F 17/30* (2006.01)

(52) U.S. Cl. .......................... 705/27; 705/26

(58) Field of Classification Search .................. 705/26, 705/27
See application file for complete search history.

(56) References Cited

U.S. PATENT DOCUMENTS

| | | | |
|---|---|---|---|
| 6,536,659 B1* | 3/2003 | Hauser et al. | 235/375 |
| 2002/0010591 A1* | 1/2002 | Pomerance | 705/1 |
| 2002/0010634 A1* | 1/2002 | Roman et al. | 705/26 |
| 2004/0193438 A1* | 9/2004 | Stashluk et al. | 705/1 |

OTHER PUBLICATIONS

Richardson, Helen; "Logistics in Reverse," Industry Week, Apr. 16, 2001; v250n6,p. 37; Dialog file 148 #13325781, 5pgs.*

* cited by examiner

*Primary Examiner*—Robert M. Pond
(74) *Attorney, Agent, or Firm*—Fulbright & Jaworski LLP

(57) ABSTRACT

A reverse logistics process or business method that optimizes the return of goods such as the return of goods under warranty claims or where the good is damaged, the wrong size, not the good the customer expected, etc. The system design accounts for the return of goods to one or a few sources after delivery to a significant number of customers.

6 Claims, 1 Drawing Sheet

REVERSE LOGISTICS PROCESS

CROSS REFERENCE TO RELATED APPLICATION

This application is a standard utility based upon provisional patent application Ser. No. 60/484,621, filed Jul. 2, 2003, the contents of which are incorporated herein.

BACKGROUND OF THE INVENTION

1. Technical Field

The present invention relates in general to methods for return shipping of goods. Specifically, the present invention relates to methods of doing business that optimize the return of goods under warranty claims, when the good is damaged, the wrong size, or not the good the customer expected, etc. More particularly, the present invention relates to methods of doing business that optimize the return of goods to one or a few sources from a significant number of customers.

2. Background Information

The current global economy is based upon numerous sellers who provide a vast array of goods. Advancements in technological resources and in global marketing have enabled sellers to reach customers throughout the world. Clearly, these sellers require logistical support to deliver their goods to their customers worldwide. The term seller ("Seller") broadly includes any individual or entity that provides goods, which may include the manufacturer, a wholesaler, a distributor, a dealer or a retailer, and the term customer ("Customer") broadly includes any individual or entity that receives goods, which may include an intermediate manufacturer, a wholesaler, a distributor, a dealer, a retailer, or any other end customer. Goods include tangible property in any shape, form, or size ("Goods"). The process of "forward logistics" captures the systematic transfer of goods from the seller to the customer. This process may contain a series of steps from one end of the transaction to the other.

For purposes of describing the forward logistics process, the seller is considered the party who currently has the goods, and the customer is the party who will be receiving the goods. These parties may or may not be the "initial" manufacturer or the "end" customer. Rather, the terminology refers to two parties who directly abut one another in the chain of distribution. Any participant in this chain of distribution will employ the services of a transportation company ("carrier") to deliver the goods from them to the next party in the chain. The chain includes, but is not limited to, manufacturers, wholesalers, distributors, dealers, retailers, and end customers.

The seller is generally a well-established company that employs the services of one or more carriers to move the goods from them to the next participant in the chain. This process is repeated as the goods move through the chain of commerce. The seller and customer have a well defined relationship and the forward logistics process in its most simplistic form takes the following methodology: a seller receives an order from an end customer, packages the order, prepares shipping documentation known as a "bill of lading," and contacts its preferred carrier who picks up the goods during its scheduled daily coverage of the region where the seller is located. In many instances, this process is automated and software readily tracks the shipment. The current information systems sufficiently track the movement of goods given the limited number of carriers and the close relationships between sellers and their carriers. These current information systems are very desirable to the sellers, carriers and customers as they are generally efficient, accurate, convenient, affective and provide real-time information, and as a result most sellers, carriers and customers would agree that this "forward logistics" system works efficiently and effectively. The seller who is typically paying the freight invoice optimizes the time, size, cost, etc. of the shipment. The seller readily understands the most cost effective, timely and efficient manner of shipping its goods based upon a variety of factors, including: shipment destination, timing, urgency, size of order, etc. In addition, the seller chooses the best shipping method, which may range from a small box to an entire truck and the best shipping mode, which may involve transportation by ground or by air.

However, in some cases the good shipped is the wrong good, size, shape, color, type, kind, etc., the customer merely does not like the good now that the customer has received it, or initially likes and begins using the good but then has a warranty claim, etc. Basically, the customer did not get what they wanted or the customer needs to make a warranty claim, or for any other reason the customer wants to return the good. In any case, the good may have to be returned to the seller. The good must be returned from the customer via some carrier to the seller. This return process is known as "reverse logistics", and is performed by a reverse logistics provider ("provider").

The most common "reverse logistics" scenario involves the last participant in the chain that takes part in manufacturing the good or its distributor is the seller, and a dealer or store is the customer. Given the shear volume of "forward logistics" transactions that take place daily, it is common that a small but still material percentage of these shipments will have to be returned by utilizing the "reverse logistics" process.

In a typical reverse logistics process, a customer calls the seller to request a return or reverse shipment. The carrier has no information on the good (unlike the forward logistics movement where the seller and the carrier perform numerous transactions and create a close working relationship), and must obtain the specifics regarding the good to be returned such as size, shape, weight, priority, etc. The provider creates a bill of lading that is typically faxed to the customer (who has already received the good and will be the "shipper" when returning it) and entered into the provider's electronic database who notifies the carrier of the pick up need. Carrier picks up the good during either its scheduled daily coverage of the region where the customer is located or when it is next geographically near the customer (except where an express or priority shipment is requested), and takes it to the provider's warehouse. At the warehouse, the provider will typically (1) validate the good as being the good identified on the bill of lading, and may even compare it to a predetermined good value list the provider has for the seller, (2) inspect the returned good, and (3) enter pertinent information including value of the good and inspection into a warehouse application that is then transmitted to the provider's main office. Information is typically gathered together at the main office and electronically delivered to the seller, who then credits the customer's account.

The "reverse logistics process," as described thus far, suffers from a number of defects and inefficiencies. First, the verification that the good picked up is the good noted on the bill of lading often does not occur until the good is delivered to the provider's warehouse. Second, verification that the good picked up matches a model number that the seller actually delivered to the customer often does not occur until the good is delivered to the provider's warehouse. Third, a serial number or other form of identification cannot be compared against a master seller list, which is necessary to verify the warranty claim or return, until the good is delivered to the provider's warehouse. Finally, the quantity of that particular good sold to that particular customer in comparison to the quantity of that particular good returned by that particular customer, does not occur until the good is delivered to the provider's warehouse. These examples are merely a sampling of the inherent deficiencies in the current "reverse logistics" process. Clearly, a better solution is needed.

BRIEF SUMMARY OF THE INVENTION

A reverse logistics process is invented for automating and optimizing the return of goods such as, goods under warranty claims or where the good is damaged, the wrong size or other parameter, or not the good the customer expected, etc. The reverse logistics process includes: the customer inputting information on a website regarding the good they wish to return, the provider verifying whether the good may be returned by comparing the information the customer provided with its own database information, and upon verification, the provider determining the most efficient shipping method for returning the good based upon the seller's needs.

The foregoing advantages, construction and operation of the present invention will become more readily apparent from the following description and the accompanying drawings.

BRIEF DESCRIPTION OF THE DRAWINGS

Preferred embodiment of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DETAILED DESCRIPTION OF THE INVENTION

Figure 1:
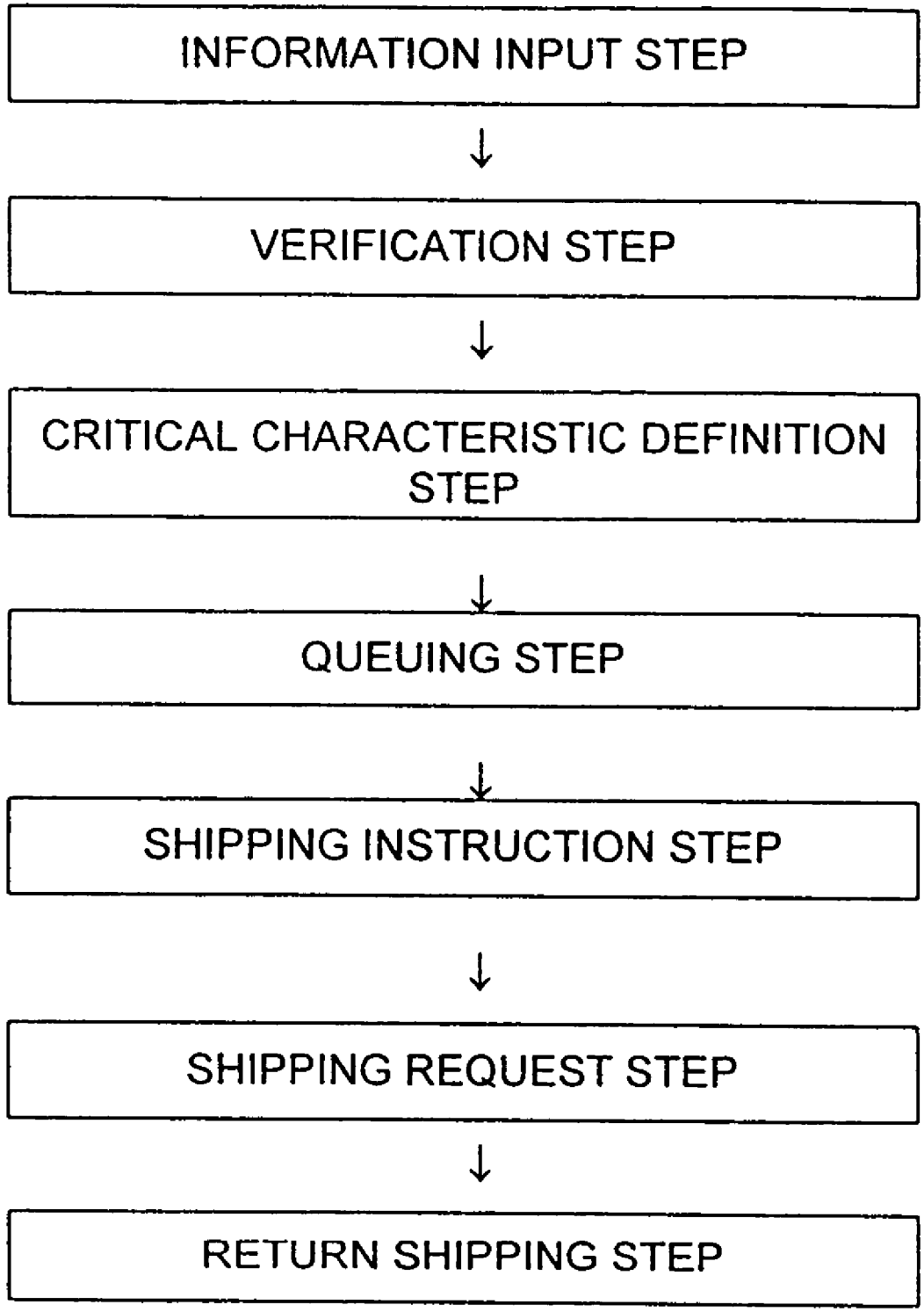
FIG. 1 is a diagram of the process.

The reverse logistics process of the present invention is generally defined below and assumes that a seller, who might be a manufacturer, distributor or other party hereinafter referred to as the seller, has shipped goods via a carrier to a customer, who might be a distributor, dealer, retailer, or end consumer hereinafter referred to as the customer. This customer desires for any of a variety of reasons to return one or more of the goods. There are a number of reasons why a good is returned including, the wrong good was shipped, the good is of the wrong size or other characteristic such as shape, color, type, kind, etc., the customer does not like the good, the good is defective and is under warranty, the good has been recalled, or any other reason that a good could be returned. This good must now be returned from the customer via some provider or carrier to the seller. This return process in general is known as the "reverse logistics process."

The present invention is a unique, non-obvious and novel reverse logistics process or method that optimizes the returning of a good to a seller that is one of many goods distributed to many customers. In the forward logistics process of distributing the goods, the seller controls the distribution through one or more carriers controlled and hired by the seller, and the seller knows the details about every shipment including which good is in each shipment, what model and/or serial numbers, what sizes, what colors, etc. The present invention optimizes the far more difficult reverse logistics process where one or more of the many customers who received one or more of the many goods the seller sells needs to return a good from the many sold by the seller. In this reverse logistics case, the customer, not the seller, has the goods to be returned and thus many difficulties arise as noted above in the background including lack of or difficulty in: 1.) acquiring information on the good, 2.) centralized control of the carrier and shipment, 3.) assuring the correct good is returned to proper location, 4.) verifying that the good being returned is eligible for return, 5.) verifying that the customer is eligible to return the good, 6.) avoiding fraud in the returns process such as where a customer returns more of the good than they ever ordered, etc.

In general, one embodiment of the reverse logistics process of the present invention involves the following steps: (1) information input via a website or other electronic communication channel on the good to be returned, known hereinafter as information input step, (2) comparison of information inputted in the information input step against a provider database, known hereinafter as verification step which may include one or more of several sub-steps such as verifying the good is a seller good, verifying the good is eligible for warranty, verifying serial number, and approval of return, (3) provider database provides critical characteristics on good to be returned known hereinafter as critical characteristic definition step, (4) queuing of return, known hereinafter as queuing step, (5) shipping instructions created including such sub-steps as the creation of a of packing slip and other necessary shipping and warranty paperwork, known hereinafter as shipping instructions step, (6) shipping request is made to carrier, known hereinafter as shipping request step, and (7) return shipping occurs under a typical shipping process as known in the art including (a) carrier picks up the good to be returned, and (b) carrier takes the good to be returned to one or more provider warehouses and eventually returns the good to seller whereby provider has less good validation to perform. The reason for less good validation is that most of the validation occurred in steps (2) to (6) between the customer and provider prior to the carrier becoming involved.

In detail, one example of the first embodiment of the process begins with the customer, who desires to return a good, logging into a provider web site which contains an administrative database. This web site may be encrypted and/or password protected, and is a web site that the provider provides for the seller. The customer will perform the information input step by inputting data using one or more of a keyboard, mouse, scanner, optical reader, voice recognition input, or the like. The provider web site requires the inputting of certain data as desired or required by the provider and/or seller. Such information may include description of the good, the name of the good, the model number of the good, the serial number of the good, the color of the good, the size of the good, the date the good was ordered, order number associated with original shipment of the good, the delivery date of the good, customer name, customer code, etc. In addition, the provider database is a "smart" database containing seller provided information such as, seller information on all types of goods, model numbers, serial numbers, customers shipped to, etc. and therefore requires accurate information input from the customer desiring the return.

Once this information is inputted into the provider database, the database performs the verification step. In this step, the seller sets forth verification parameters that are desirable to the seller such as, verification that the good is seller's good versus a competitors which may be done by comparison of model or serial numbers. Other verifications that may be performed include: verification that the good is under warranty, by perhaps reviewing the delivery date, verification that the customer has actually purchased that type of good from seller in the past and that the quantity of returns does not exceed the number of purchases, verification that the original manufacturer ("OEM") of the good desires or allows returns via a middle-man versus directly to the OEM where the seller is not the OEM, etc. The provider database will deny any request with inaccurate, fraudulent or incomplete information thereby assuring only proper authorized returns, i.e., returns of seller's goods within the return or warranty period from a customer certified to make returns, etc. The provider database may also be programmed to perform statistical analysis on specific good types, specific customers, etc. to allow the seller to identify specific good or customers with abnormal rates of returns, etc. that may be investigated by the seller prior to, during or after a return shipment. This would allow the seller to more readily identify at an earlier time repetitive issues such as any carriers that are repeatedly damaging goods, any customers that have an unusually high return rate, etc.

For example, a customer cannot enter the serial number of a transmission to be returned where the serial number corresponds to a brand X transmission when the return is being attempted with a brand Y transmission on provider's database. A second example of the smart characteristics of such a database is as follows: a customer who only originally ordered three widgets from a seller will be denied any attempt to return a fourth widget, under warranty thereby prohibiting excessive fraud where parts are returned that are purchased in the salvage market, etc. A third example of the smart characteristics of such a database is as follows: the customer purchased one widget from seller three years ago with a one year warranty and another of the same type widget six months ago with a one year warranty whereby the provider's database requests serial numbers thereby assuring the older good no longer under warranty is not returned as if it were under warranty. These and many other examples show the characteristics of the database at this point in the reverse logistics process and how the seller saves significant money by never wrongly agreeing to return these goods.

Once all programmed verifications have occurred, the database provides either an approval or denial of the return. This approval is the approval verification sub-step of the verification step.

Critical characteristics are then provided by the provider database to optimize shipping. These may include shipping parameters such as return delivery speed for perishable items, packing requirements for fragile goods, as well as size and weight parameters to assist in optimization of the truck size or number of trucks needed. The size and weight parameters are critical in allowing the provider to choose the proper mode of carriage. Shipping rates vary amongst motor carriers whereby certain companies rates and timing to ship a small package may be optimal while their ability to ship a partial or full truck may not be optimal, or they may not even offer such a large shipment option. In other cases, a certain carrier may be optimal for the larger returns. Distances for the shipment may also be a factor in motor carrier choice as certain carriers may not provide shipping to all locations, or may be more expensive or not timely for certain pick-ups or destinations. The provider database may include the rates, tariffs and limitations of the approved carriers and optimizes the return shipment parameters to provide the optimized cost and timing for the return shipment. The critical characteristics step produces two outputs that optimize the reverse logistics process including, size and weight parameters that the customer uses to determine the optimal carrier or an instruction on which carrier to use based upon the size, weight and distance parameters.

The shipment is queued after a carrier is determined. This determination is based upon the critical characteristics. The queuing step involves both (a) placing the shipment in a standard carrier's queue such that the carrier will pick up the return shipment either on its usual daily or routine rounds or on a more urgent basis if needed, and (b) verifying the return shipment meets standard return shipment parameters between that particular customer and the seller. Such standard return shipping parameters may be any queuing rules between the parties including no more than a set number of return shipments per period unless customer pays for extra return shipments. The queue is typically maintained by the provider with information thereon transmitted via the web or a database to seller and customer.

Once the return shipment is queued, optimized shipping instructions are transmitted to the customer. In this shipping instructions step, shipping instructions are created, which include a packing slip, bill of lading, and other necessary shipping and warranty paperwork. This paperwork is typically created by the web site and printable at the customer's location.

The shipping request is made to carrier by transmitting the shipping instructions to the carrier. At the proper time based upon the queuing, the carrier arrives at the customer location for return shipping. The carrier picks up the return good, transports it to a designated provider warehouse, and returns it to seller. The customer's account is then credited.

In sum, the process involves the following steps: (1) information input step, (2) verification step, (3) critical characteristic definition step, (4) queuing step, (5) shipping instructions step, (6) shipping request step, and (7) return shipping occurs under a typical shipping process as known in the art including (a) carrier picks up good to be returned, and (b) carrier takes good to be returned to a designated provider warehouse and eventually returns good to seller.

The above process is one embodiment of the reverse logistics method of the current invention. Many other embodiments are contemplated. These include embodiment with the following features or variations.

The information input step is any form of inputting general information on the customer and the good to be returned to the seller. Such step may involve use of the internet or other common worldwide publicly-available network, or alternatively a secure private seller or carrier network that the customer accesses via a telephonic, cable-modem, modem, DSL, T-1 or other high speed connection. The software may be downloaded or otherwise provided to the customer, or most preferably is a web-site with software that is maintained by the provider on its network whereby the customer logs in and uses its interface and database in a select and secure manner. Preferably, the software and/or user interface guides the customer through the questions that need to be answered and only allows the customer to proceed if all questions are answered with accurate and correct information.

This involves the verification step where many pieces of information may be verified including that the good is a seller good rather than a competitor good, that the good is eligible for warranty, that the good is eligible for return versus an "all sales final" or other clearance sale good, that the customer knows the serial number and such serial number is one of the seller's goods, that the customer is a customer of the seller, that the customer is current on its account with seller, and if these and any other verifications the seller or provider requires are sufficiently answered in an acceptable manner, then approval of return is given. This verification step is performed on a computer housing a provider database containing critical information on the seller goods, customers, etc. The database interacts with the customer inputted information from the input step to perform this verification. The database may be any form of an electronic database that has "smart" capabilities allowing for it to be searched, prioritized, categorized or otherwise able to manipulate and sort data. The database also in various embodiments provides critical characteristics on good to be returned. These characteristics may be any information known about a good, a customer, a carrier, etc. The database is capable of storing many characteristics on each good, and such useful information may be used for a return good to optimize the return process including speed, type and manner of return.

The customer, provider and seller all use the common reverse logistics database. This assures that all parties have up-to-date information as each thus always has information on the good in question, assurance that the correct good is returned to proper location, verification that the good being returned is eligible for return, verification that the customer is eligible to return the good, assurance that common fraud in the returns process such as where a customer returns more of the good than they ever ordered is avoided.

Accordingly, the invention as described above and understood by one of skill in the art simplifies the reverse logistics process by providing an optimized, effective, and efficient system and process, which eliminates difficulties encountered with prior systems and processes, solves problems, and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the invention's description and illustration is by way of example, and the invention's scope is not limited to the exact details shown or described.

Having now described the features, discoveries and principles of the invention, the manner in which it is constructed and used, the characteristics of the construction, and the advantageous, new and useful results obtained; the new and useful structures, devices, elements, arrangements, parts and combinations, are set forth in the appended claims.

The invention claimed is:

1. A reverse logistics process comprising:
   inputting information into a website on a good that a customer desires to return wherein the step of inputting information on the good includes inputting at least one of the following: description of the good, name of the good, model number of the good, serial number of the good, color of the good, size of the good, good order date, order number associated with original shipment of good, good delivery date, customer name, and customer code;
   verifying the returnability of the good by comparing the information inputted by the customer on the website against a provider database and parameters for returning the good wherein the parameters for returning the good further comprise verifying the good is a seller good, verifying the good is eligible for warranty, verifying the good is approved for return and/or any combination thereof;
   optimizing the timing and shipping method for the returning of the good based upon shipping parameters in the provider database wherein the shipping parameters further comprise return delivery speed for perishable items, packing requirements for fragile goods, size and weight parameters, shipment size, requirements of truck, carrier capabilities and/or any combination thereof;
   determining a carrier;
   queuing the shipment wherein the queuing wherein the queuing step further comprises placing the shipment in a standard carrier's queue such that the carrier will pick up the return shipment either on its usual rounds or on a pre-requested bases and verifying the shipment meets standard return shipment parameters between the particular customer and the seller;
   creating shipping instructions and documents;
   making a shipping request to the carrier; and
   returning the shipment wherein the carrier picks up the good and follows the sellers instructions for handling the good.

2. The reverse logistics process of claim 1 wherein the step of verifying the returnability of the good includes receiving approval or denial to return the good includes receiving approval or denial to return the good after comparing the inputted information to the provider database information including at least one of the following: all good types, model numbers, serial numbers, customer shipped to, dates of customer shipments, goods shipped to customer, and quantities shipped to customer.

3. The reverse logistics process of claim 1 wherein the step of determining the most efficient timing and shipping method includes receiving critical characteristics on the good from the provider database.

4. The reverse logistics process of claim 3 wherein the step of receiving critical characteristics on the good from the provider database involves receiving shipping parameters from the provider database.

5. The reverse logistics process of claim 4 wherein the shipping parameters include one or more of the following:
   return delivery speed for perishable items, packing requirements for fragile goods, and size and weight parameters which are used to assist in optimization of shipment size, and requirements of truck.

6. The reverse logistics process of claim 4 wherein the shipping parameters include one or more of the following:
   return delivery speed for perishable items, packing requirements for fragile goods, and size and weight parameters which are used to assist in optimization of choice of carrier, truck size, and requirements of truck based upon the various shipping rates available to the seller for different shipment sizes, timing, and other requirements.

* * * * *